(12) United States Patent
Hillis et al.

(10) Patent No.: US 8,767,719 B2
(45) Date of Patent: Jul. 1, 2014

(54) SYSTEM AND METHOD FOR SPLIT SIP

(75) Inventors: Brian Hillis, Centennial, CO (US); Renato Simoes, Fortaleza (BR); Pier Angelo Filho Tognini, Goiânia (BR)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 13/243,741

(22) Filed: Sep. 23, 2011

(65) Prior Publication Data
US 2013/0077617 A1 Mar. 28, 2013

(51) Int. Cl.
*H04L 12/66* (2006.01)
*H04J 3/16* (2006.01)
*H04M 1/64* (2006.01)
*G06F 15/16* (2006.01)

(52) U.S. Cl.
USPC ......... 370/356; 370/466; 379/88.12; 709/228

(58) Field of Classification Search
None
See application file for complete search history.

(56) References Cited

U.S. PATENT DOCUMENTS

| | | | |
|---|---|---|---|
| 2003/0061354 A1* | 3/2003 | Burg et al. | 709/227 |
| 2004/0068574 A1* | 4/2004 | Costa Requena et al. | 709/230 |
| 2006/0078096 A1* | 4/2006 | Poyhonen et al. | 379/88.12 |
| 2007/0140150 A1* | 6/2007 | Beck et al. | 370/279 |
| 2007/0201665 A1* | 8/2007 | Kocan et al. | 379/201.02 |
| 2009/0164639 A1* | 6/2009 | Sylvain | 709/227 |
| 2009/0164645 A1* | 6/2009 | Sylvain | 709/228 |
| 2009/0262668 A1* | 10/2009 | Hemar et al. | 370/260 |
| 2010/0235856 A1* | 9/2010 | Huang | 725/25 |
| 2010/0266111 A1* | 10/2010 | Crausaz et al. | 379/93.29 |
| 2011/0055412 A1* | 3/2011 | Kongalath et al. | 709/228 |
| 2011/0072144 A1* | 3/2011 | Fikouras et al. | 709/230 |
| 2011/0078319 A1* | 3/2011 | Ishida | 709/228 |

OTHER PUBLICATIONS

"Translation routing", Circo Support Community, Discussions, Feb. 26, 2007, Retrieved from https://supportforums.cisco.com/message/1035916?tstart=0.
"Working with Translation Routes", A White Paper from Cisco Systems, Inc., Application Technology Group, Customer Contact Business Unit, Jul. 8, 2008.

* cited by examiner

*Primary Examiner* — Melanie Jagannathan

(57) ABSTRACT

Disclosed herein are systems, methods, and non-transitory computer-readable storage media for splitting SIP back-to-back user agents and converting SIP communications between a back-to-back user agent server and a back-to-back user agent client to HTTP requests while preserving SIP headers. The back-to-back user agent server receives a SIP invite from a caller and converts the SIP invite to an HTTP request, wherein headers from the SIP invite are preserved in the HTTP request. The server transmits the HTTP request to a user agent client via a wide area network connection and receives, from the user agent client, an HTTP response to the HTTP request. The server converts the HTTP response to a SIP response, and transmits the SIP response to the caller, wherein the SIP response contains instructions for establishing SIP communications between the caller and a callee via a network.

17 Claims, 7 Drawing Sheets

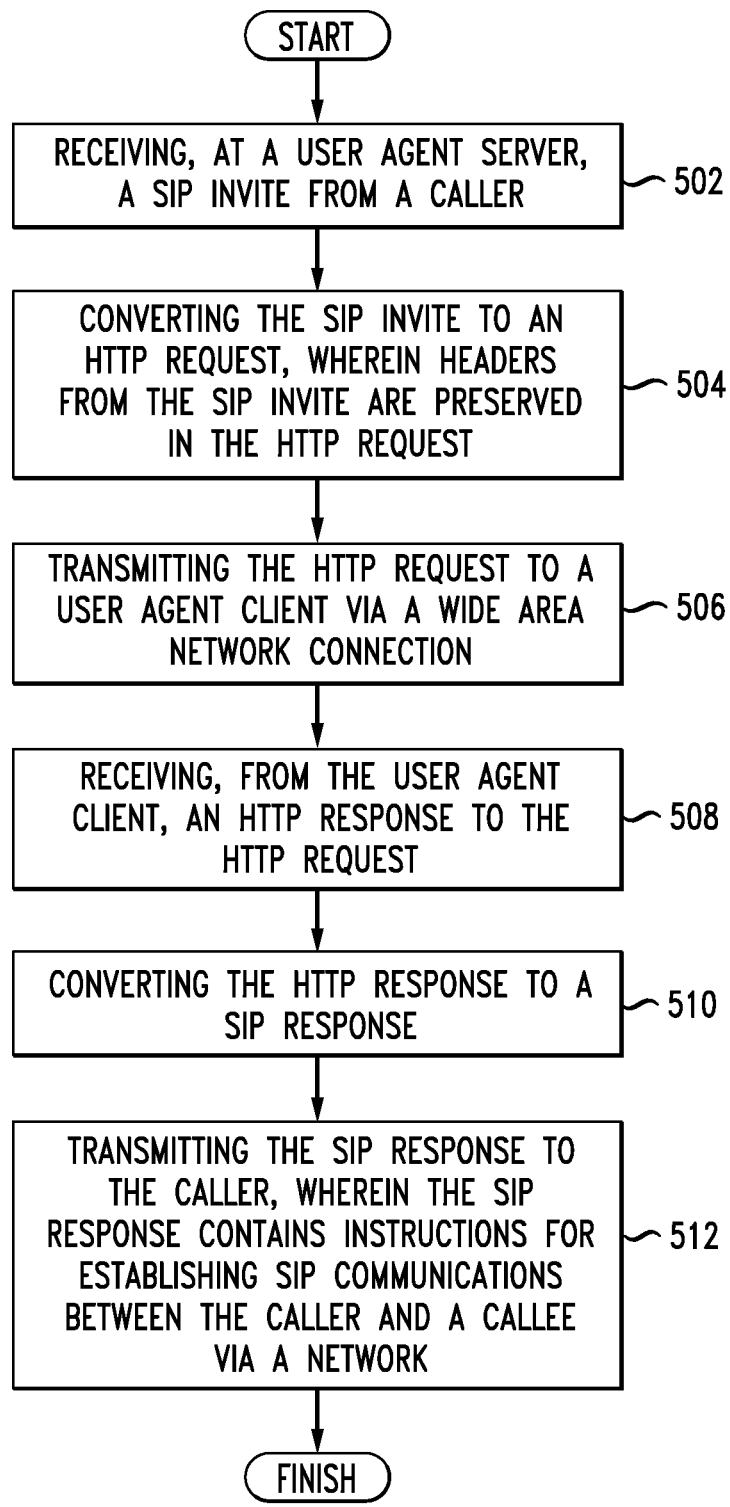

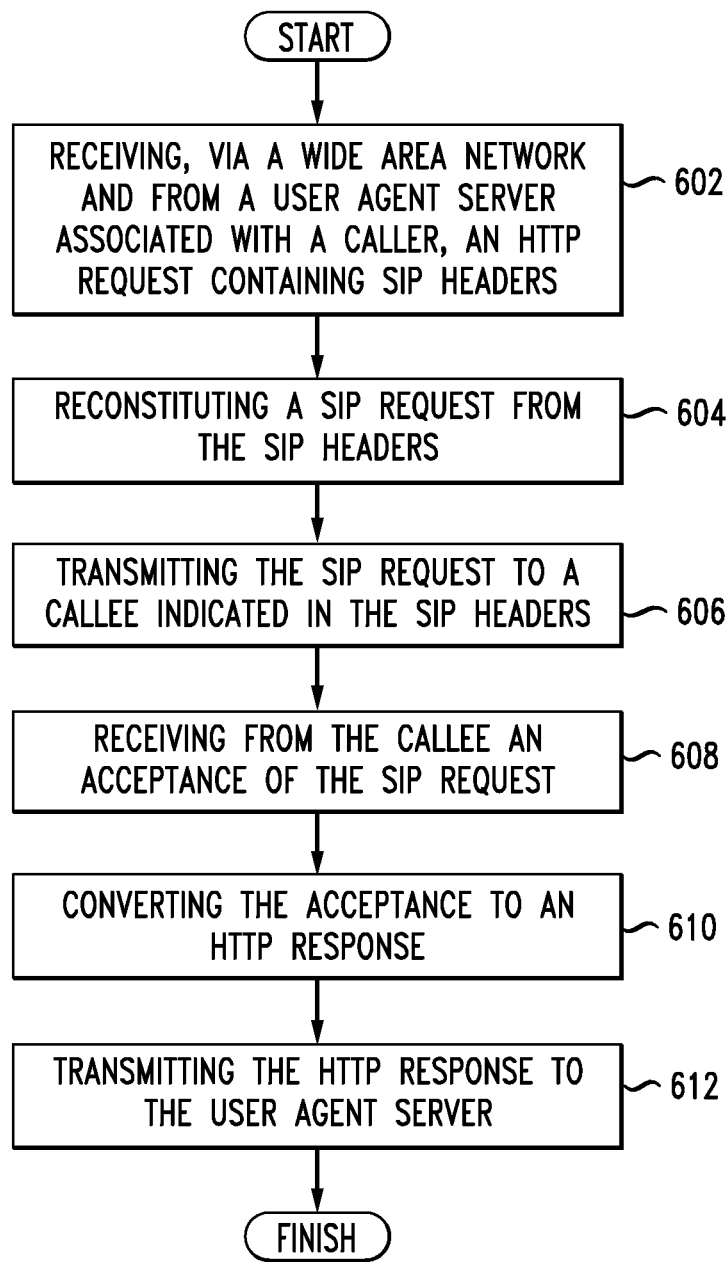

SYSTEM AND METHOD FOR SPLIT SIP

BACKGROUND

1. Technical Field

The present disclosure relates to transferring calls and more specifically to efficiently transferring calls among multiple locations while preserving the call context.

2. Introduction

In environments with multiple automatic call distributors (ACDs), where calls are shared across various locations, call transport is performed either via Voice over IP (VoIP) transport over a wide area network or traditional Public Service Telephony Network (PSTN) circuits. One significant challenge in transferring calls among multiple locations is preserving or maintaining call context for reporting, computer telephony integration (CTI), or other purposes. In other words, the data associated with a call leaving one location must be linked together in some way when the call arrives at another location. While the VoIP method of call transport can carry a call ID to resolve this issue, the transfer of calls over a PSTN network generally results in a loss of call IDs. As a result, all or part of the call context is lost.

In many cases, customers have not built-out the required network infrastructure to support sending VoIP traffic over WAN facilities. This is because, depending on the location of the different ACD facilities, such a build-out is too costly, or the volume of traffic does not justify the investment in such facilities. Some approaches to this problem, such as "Translation Routing" or "DNIS Pool Routing", attempt to resolve this issue through a traditional CTI integration. These approaches are non-strategic to the call center shift to SIP-based applications and infrastructure because the solutions are custom to each ACD platform, and not easily extensible.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein rely on open architectures, Session Initiation Protocol (SIP) and HyperText Markup Language (HTTP), and provide a way to carry the user-to-user information (UUI) from two remotes call centers. The method converts the call signaling from SIP to HTTP, rather than using direct inward dialing (DID) allocation and conversion from SIP to PSTN. This method greatly reduces deployment costs because it eliminates PSTN costs.

This approach sends call data along with the call between remote call centers which are not connected via VoIP, without use of PSTN or CTI, and without shared web-services. This approach can reduce costs significantly, as it does not require PSTN to get the call to the remote call center.

The back-to-back user agent can be split to separate locations and communicate via standard SIP and HTTP, which are easily extensible, in order to send call data along with the call transfer between call centers that traverse unknown networks. The back-to-back user agent can also send or preserve the UUI header along with the transfer call without use of a PSTN link between the remote call centers and without huge investments in interconnecting remote VoIP sites.

Disclosed are systems, methods, and non-transitory computer-readable storage media for practicing split SIP communications. A split SIP back-to-back user agent server receives a SIP invite from a caller and converts the SIP invite to an HTTP request. The HTTP request preserves at least a portion of the headers from the SIP invite. The headers can include one or more of user-to-user information (UUI), a call ID, an IP address, and a via header. The back-to-back user agent server transmits the HTTP request to a user agent client via a wide area network connection, such as the Internet. Because the request is transmitted via HTTP, routers are much more likely to allow the communication, whereas many routers are configured to automatically block SIP traffic.

The back-to-back user agent server receives, from the user agent client, an HTTP response to the HTTP request and converts the HTTP response to a SIP response. Then the back-to-back user agent server transmits the SIP response to the caller. Here, the SIP response contains instructions for establishing SIP communications between the caller and a callee via a network. The SIP communications can be independent of and not rely on a PSTN. In one embodiment, the SIP communications occur via real-time transport protocol (RTP). The SIP communications can take a different network path than the HTTP response and/or HTTP request, and can even traverse an entirely different network.

The user agent client and the user agent server can be separate software processes running on separate devices. At least one of the user agent server and the user agent client can be associated with a call center, either by organizational association, by function, and/or by location.

A split SIP back-to-back user agent client receives, via a wide area network and from a user agent server associated with a caller, an HTTP request containing SIP headers and reconstitutes a SIP request from the SIP headers. Then the user agent client transmits the SIP request to a callee indicated in the SIP headers. The user agent client receives from the callee an acceptance of the SIP request and converts the acceptance to an HTTP response. The user agent client can then transmit the HTTP response to the user agent server.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example method embodiment of the operations of a back-to-back user agent server; and FIG. 6 illustrates an example method embodiment of the operations of a back-to-back user agent client.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for enabling SIP communications which maintain UUI information between two remote sites without relying on PSTN and without requiring an expensive VoIP buildout between sites. A brief introductory description of a basic general purpose system or computing device in FIG. 1 which can be employed to practice all or part of the concepts is disclosed herein. A more detailed description of split SIP will then follow. These variations shall be discussed herein as the various embodiments are set forth. The disclosure now turns to FIG. 1.

Figure 1:
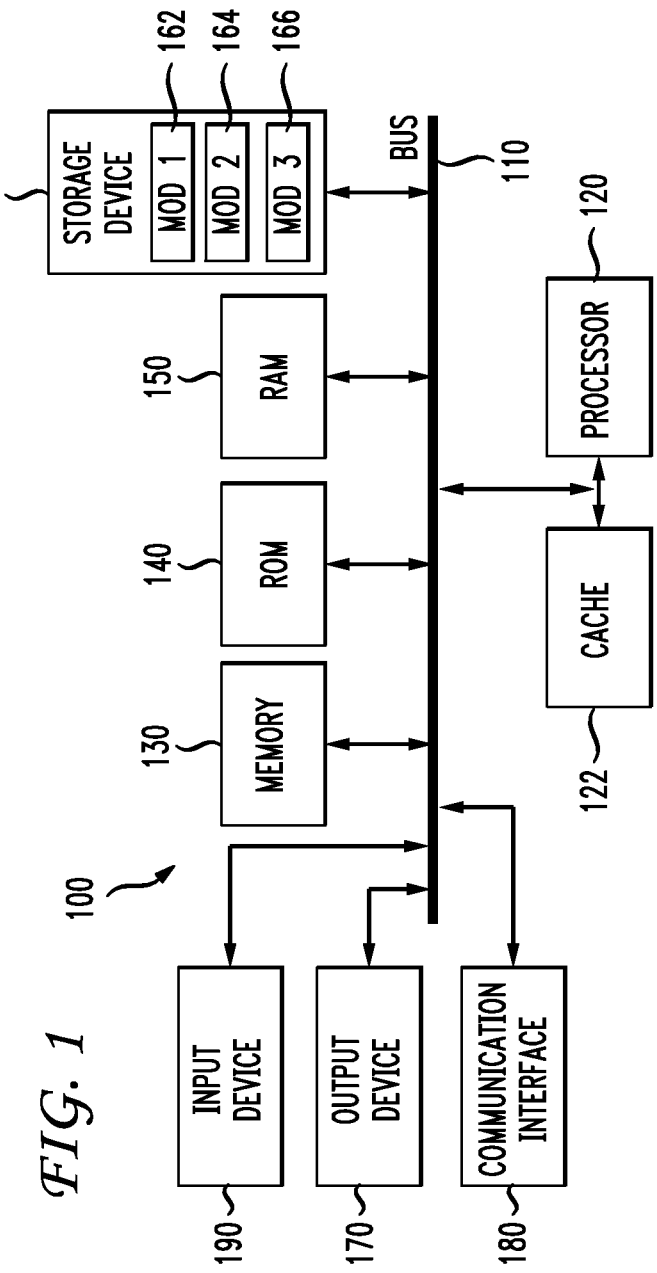
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
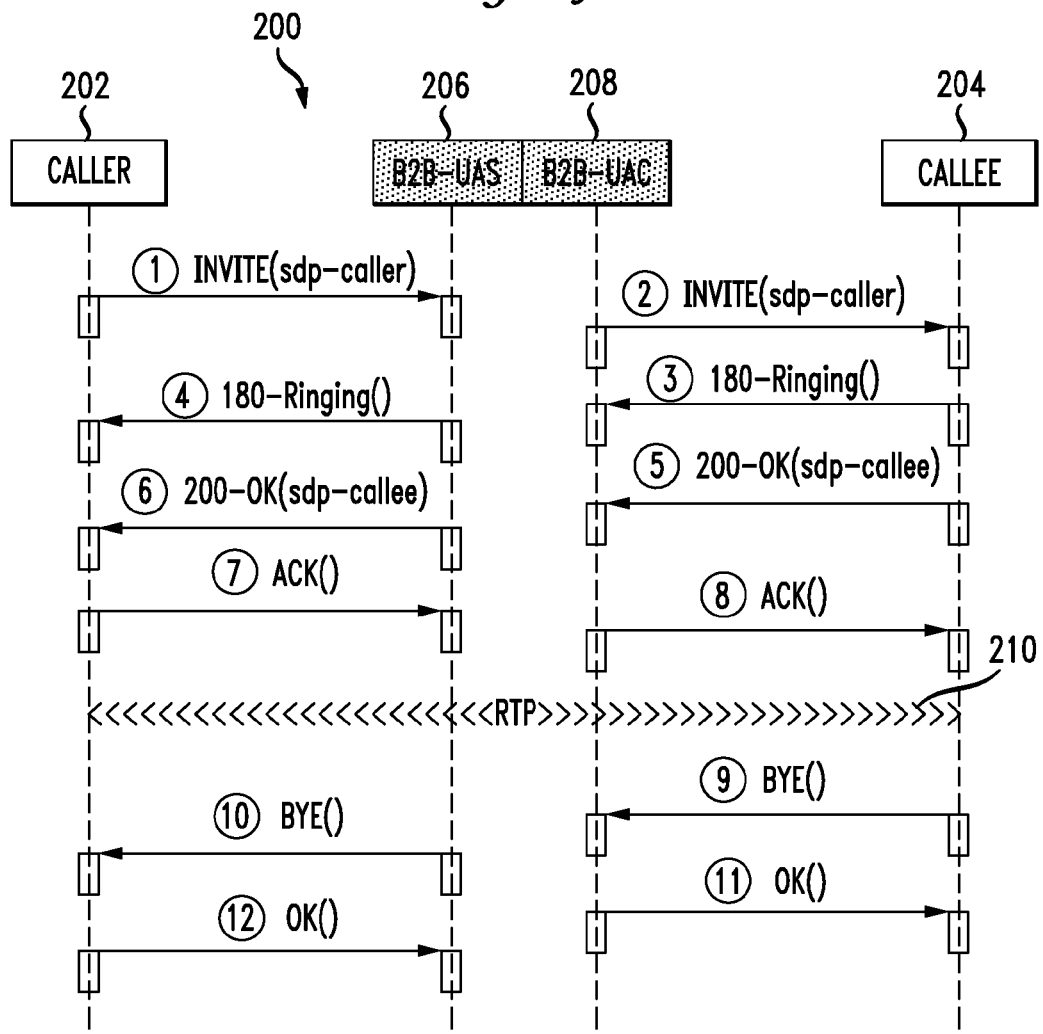
FIG. 2A illustrates an example basic SIP call flow based on a back-to-back user agent.

Having disclosed some components of a computing system, the disclosure now turns to FIG. 2A, which illustrates an example basic SIP call flow 200 based on a back-to-back user agent architecture. In this example, the back-to-back user agent server 206 and the back-to-back user agent client 208 reside in a single SIP server and are part of the same deployed SIP application.

The call flows as a mirror signaling, where the back-to-back user agent server 206 instructs the back-to-back user agent client 208 to forward its signaling on from the caller 202 to the callee 204 and vice versa. The back-to-back user agent terminates a signaling and starts a new one, insulating the endpoints. CallID, IPs, Via headers are all different from one SIP leg (i.e. the SIP leg from the caller 202 to the back-to-back user agent server 206) to the other SIP leg (i.e. from the callee 204 to the back-to-back user agent client 208).

At step 1, the caller 202 sends a SIP invite to the back-to-back user agent. At step 2, the back-to-back user agent sends an invite to the callee 204. At step 3, the callee 204 sends a ringing signal back to the back-to-back user agent, which relays that ringing signal to the caller 202 at step 4. At step 5, the callee 204 sends an OK or acceptance of the invite to the back-to-back user agent, which forwards that acceptance to the caller at step 6. At step 7, the caller 202 sends an acknowledgement of the acceptance to the back-to-back user agent, which forwards the acknowledgement to the callee 204 at step 8. At this point 210, the caller 202 and the callee 204 can establish communications with one another via RTP or other suitable protocol. Steps 9 and 10 and steps 11 and 12 demonstrate a set of goodbye and OK communications ending the invitation process. This type of call flow gives the application a great flexibility in manipulating the endpoints.

Figure 2B:
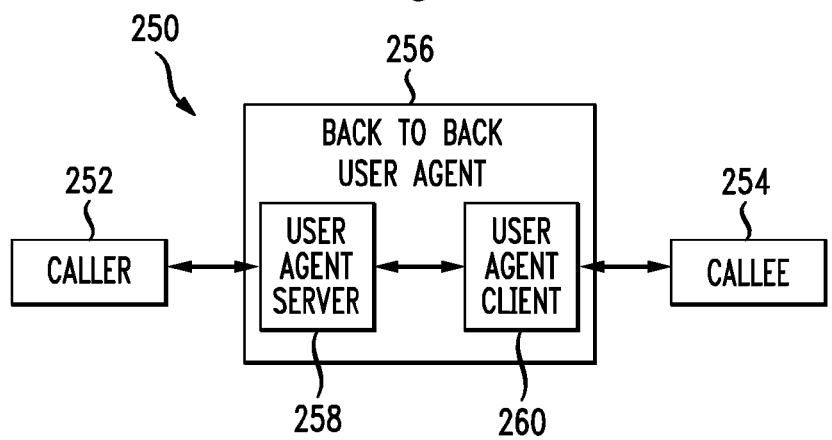
FIG. 2B illustrates an example network architecture supporting the basic SIP call flow of FIG. 2A.

FIG. 2B illustrates an example network architecture 250 supporting the basic SIP call flow of FIG. 2A. In this architecture, the caller 252 communicates with the callee 254 via a back-to-back user agent 256 which includes a user agent server 258 and a user agent client 260. In this architecture, the user agent server 258 and the user agent client 260 are separate software processes running in a same machine. The caller 252 and the callee 254 can be on the same physical network and/or virtual network as the back-to-back user agent.

Figure 3A:
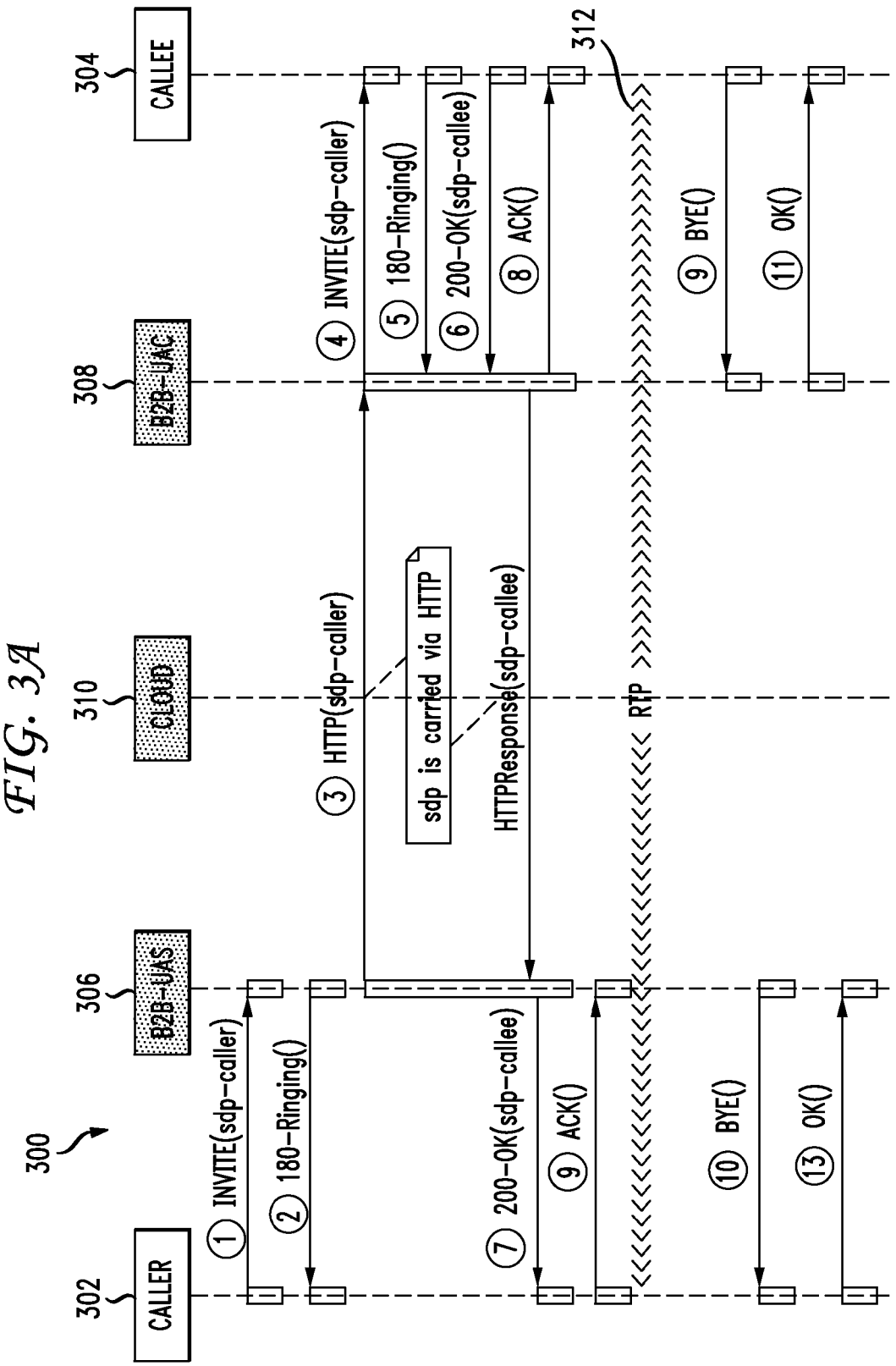
FIG. 3A illustrates an example SIP call flow based on a split back-to-back user agent with components residing across a network.

FIG. 3A illustrates an example SIP call flow 300 based on a split back-to-back user agent with components residing across a network or cloud 310. The back-to-back user agent is split into a back-to-back user agent server 306 associated with a caller 302, and a back-to-back user agent client 308 associated with a callee 304. The server 306 and the client 308 reside in different applications and can reside in entirely different SIP application servers. The SIP application servers can reside across a wide area network or a network cloud 310, such as the Internet.

At step 1, when the caller 302 sends a call or invite to the server 306, the server 306 cannot simply invoke a local method call to instruct the client 308 to send the invite out to the callee 304. Instead, the server 306 and the client 308 communicate via HTTP through the cloud 310. HTTP is a far more open protocol than SIP. Most firewalls are open to HTTP, and no additional hardware is required to support the remoteness part of this call flow, as opposed to SIP which typically requires special equipment and/or configurations. At step 2, the server 306 can send a ringing signal to the caller 302 while locating and communicating with the client 308.

At step 3, the server 306 transmits the payload of the originating invite, the session description protocol (SDP), but can also carry other basic headers such as "From" and "To", so the remote client 308 can construct the proper invite before sending it out to the callee 304 in step 4. At step 3, the client 308 can also send call IDs (such as the UUI header) for correlating both remote sides of the call, and can also send any number of Custom Headers (that could carry call context) over to the remote end.

At steps 5 and 6, the callee 304 can send a ringing signal to the client 308 and an OK or acceptance of the invite, which the client 308 transfers via HTTP to the server 306, and forwards to the caller 302 at step 7. Steps 8 and 9 are the respective acknowledgements. At this point, the caller 302 can establish communications with the callee 304 via RTP 312. Note that we have not made a 1-to-1 mapping between the SIP and HTTP. This is for optimization purpose. RTP follows a path of its own. The SIP and HTTP signaling are used to set up the call, i.e. exchange the caller and callee SDPs. After the SDPs are exchanged, the endpoints can establish a callpath directly between them via RTP. The RTP does not necessarily flow through the SIP servers or even the same network as the HTTP communications. Steps 10 and 11 and steps 12 and 13 demonstrate a set of goodbye and OK communications ending the invitation process. This type of call flow gives the application a great flexibility in manipulating the endpoints.

Figure 3B:
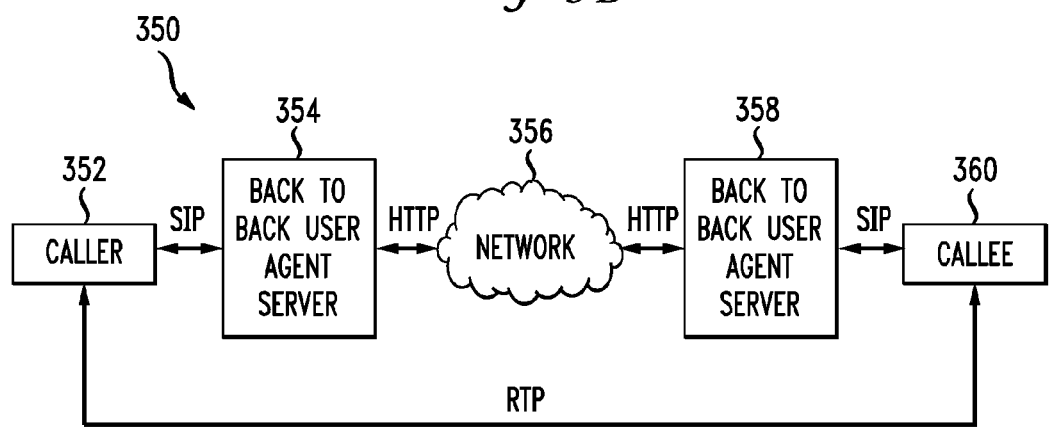
FIG. 3B illustrates an example network architecture supporting the split SIP call flow of FIG. 3A.

FIG. 3B illustrates an example network architecture 350 supporting the split SIP call flow of FIG. 3A. In this architecture, the caller 352 communicates with the callee 354 via a back-to-back user agent server 354. The back-to-back user agent server 354 communicates via a network 356 with a back-to-back user agent client 358 associated with a callee 360. In this architecture, the back-to-back user agent server 354 communicates with the caller 352 using SIP and with the back-to-back user agent client 358 via HTTP. Likewise, the back-to-back user agent client communicates with the back-to-back user agent server 354 via HTTP and with the callee 360 via SIP.

Figure 4:
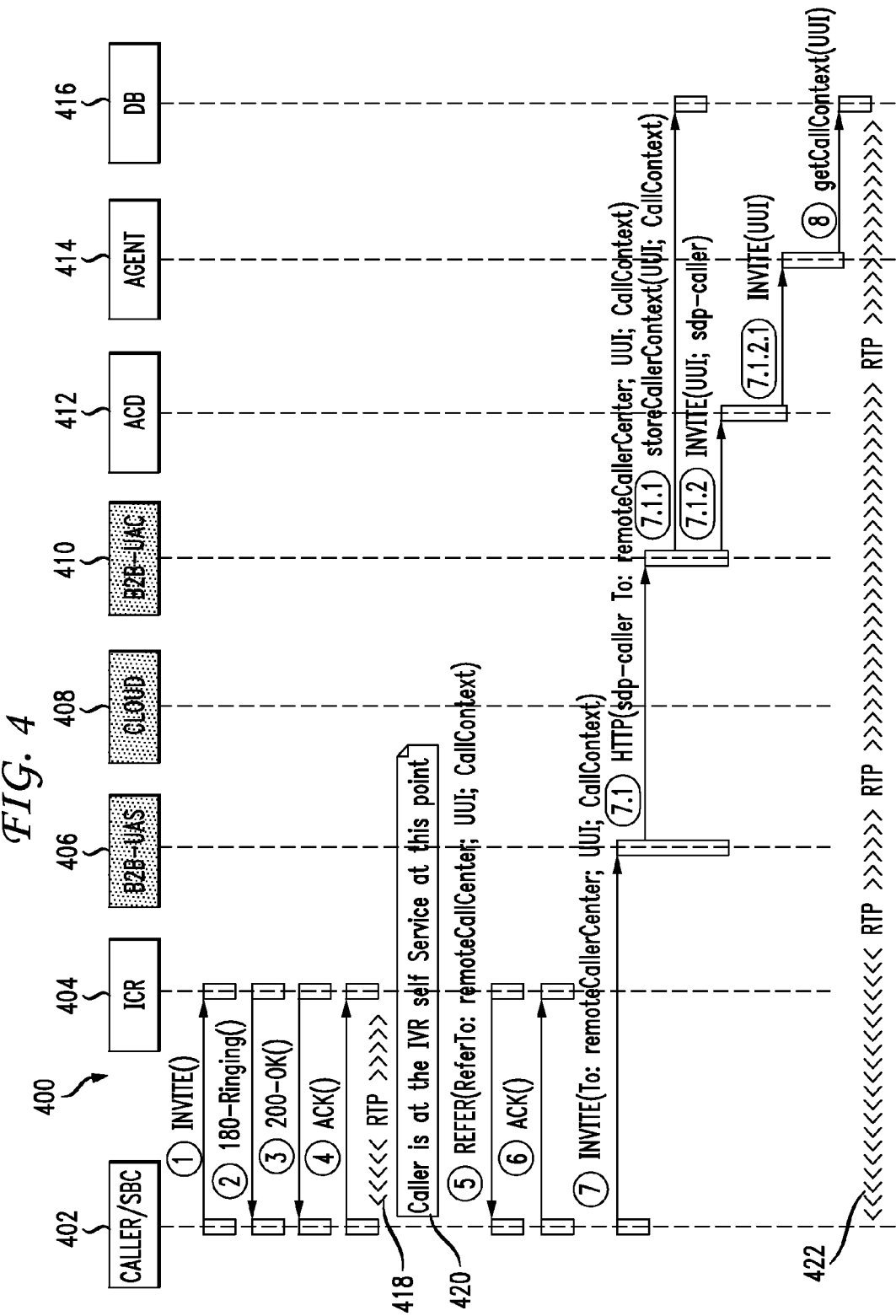
FIG. 4 illustrates an example call center use case of the split SIP call flow.

FIG. 4 illustrates an example call center use case of the split SIP call flow. For purposes of clarity, FIG. 4 does not include all the SIP and HTTP messages used in the split SIP call flow. As illustrated in FIG. 4, the caller 402 first dials in and is connected, via RTP 418, to ICR 404, which is a self-service interactive voice response (IVR) system. At step 1, the caller 402 sends a SIP invite to ICR 404. The ICR 404 sends a ringing signal to the caller at step 2 and an OK at step 3. At step 4, the caller 402 sends an acknowledgement. At this point, the caller 402 is at the self-service IVR system 420, ICR 404.

The caller 402 then requests to be transferred to a live agent. The ICR 404 decides, based on a custom profile, that the call should be sent to a specific remote call center, which has experts on the subject the caller wants to talk about and has agents that speak the native language of the caller 402. The ICR 404 then sends a transfer request (REFER) at step 5. The ICR 404 makes standard usage of the "Refer-To" header (a REFER header) to send the destination address of the remote call center and pass other headers params, such as the UUI and any CallContext the ICR 404 has gathered during the self-service. At step 6, the caller 402 sends an OK to the ICR 404.

At step 7, the caller 402 sends a new INVITE, which complies with the standard SIP REFER, to the destination specified in the Refer-To header (of the REFER message) and adds (to the INVITE) the header params (UUI and CallContext) that were specified in the Refer-To header. At step 7.1, the B2B-UAS 406 converts the INVITE to an HTTP request, and sends the HTTP request to the remote B2B-UAC 410. Here, the B2B-UAS 406 also adds the relevant data (To, From, Caller-SDP, UUI, CallContext) to the HTTP request. At step 7.1.1, the remote B2B-UAC 410 receives the HTTP request and stores the CallContext into the DB 416 using the UUI as the key to the data. The DB 416 is a data store, which can be a file, directory, log, table, database, cache, and so forth. The call context is temporarily stored to allow the Agent 414 to retrieve it later, as the automatic call distributor, ACD 412, does not support the CallContext to be sent along the SIP INVITE into ACD 412. At step 7.1.2, the B2B-UAC 410 then sends the INVITE to ACD 412 (to queue a call) and includes the UUI as a header. At step 7.1.2.1, the ACD 412 sends the SIP INVITE, which includes the UUI, to the Agent 414. Once the Agent 414 receives the call at step 8, it retrieves the CallContext from DB 416, using the UUI as the key, and uses the data to pop-up the relevant info to the Agent 414.

Having disclosed some basic system components and concepts, the disclosure now turns to the exemplary method embodiments shown in FIGS. 5 and 6. For the sake of clarity, the methods are discussed in terms of an exemplary system 100 as shown in FIG. 1 configured to practice the respective methods. The steps outlined herein are exemplary and can be implemented in any combination thereof, including combinations that exclude, add, or modify certain steps.

FIG. 5 illustrates an example method embodiment of the operations of a back-to-back user agent server. The system 100 receives, at a user agent server, a SIP invite from a caller (502). The SIP invite can originate from a caller and/or from a client device on behalf of the caller. The system 100 converts the SIP invite to an HTTP request, wherein headers from the SIP invite are preserved in the HTTP request (504). This approach can enable the user agent server to transmit the SIP invite via HTTP, which many routers allow without additional security checks, whereas many routers' default settings block straight SIP traffic or only allow SIP traffic from approved or trusted sources.

The system 100 transmits the HTTP request to a user agent client via a wide area network connection (506). The wide area network can be a public network such as the Internet, but can also include a private or quasi-private network such as an internal corporate network, a virtual private network (VPN), or a shared collaboration network between separate universities. The user agent client can be a separate software package running on a first device that is completely separate from the user agent server running on a second device. The user agent server and/or the user agent client can be associated with a call center. The headers can include user-to-user information (UDI), a call ID, an IP address, a via header, and/or other call-related information.

The system 100 receives, from the user agent client, an HTTP response to the HTTP request (508) and converts the HTTP response to a SIP response (510). Then the system 100 transmits the SIP response to the caller, wherein the SIP response contains instructions for establishing SIP communications between the caller and a callee via a network (512). The communications between the user agent server and the user agent client may be independent of a public switched telephone network. The caller and callee can establish SIP communications via real-time transport protocol (RTP). The SIP communications can follow a separate network path from the HTTP request, or can traverse an entirely separate network. The user agent client can convert the HTTP request to a reconstructed SIP invite and send the reconstructed SIP invite to the callee.

FIG. 6 illustrates an example method embodiment of the operations of a back-to-back user agent client that interacts with the back-to-back user agent server the operations of which are described in relation to FIG. 5. The system 100 receives, via a wide area network and from a user agent server associated with a caller, an HTTP request containing SIP headers (602) and reconstitutes a SIP request from the SIP headers (604). The system 100 transmits the SIP request to a callee indicated in the SIP headers (606). The system 100 receives from the callee an acceptance of the SIP request (608), then converts the acceptance to an HTTP response (610) and transmits the HTTP response to the user agent server (612).

The approaches disclosed above use standard SIP and HTTP, which are easily extensible. Besides sending call data along with the call transfer between call centers that traverses unknown networks, the system can also send and/or preserve the UUI header along with the transfer call, without a PSTN link between the parties.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any organization that uses SIP to communicate with other organizations or to communicate internally from one location to another. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, at a user agent server, a Session Initiation Protocol (SIP) invite from a caller device;
converting the SIP invite to a Hypertext Transfer Protocol (HTTP) request, wherein headers from the SIP invite are preserved in the HTTP request;
transmitting, via a wide area network connection, the HTTP request to a user agent client that is separate from the user agent server, wherein the user agent client operates on a first application server and the user agent server operates on a second application server separate from the first application server;
receiving, from the user agent client and via the wide area network connection, an HTTP response to the HTTP request;
converting the HTTP response to a SIP response; and
transmitting the SIP response to the caller device, wherein the SIP response contains an instruction for establishing a SIP communication between the caller device and a callee device.

2. The method of claim 1, wherein the user agent client can convert the HTTP request to a reconstructed SIP invite and send the reconstructed SIP invite to the callee device.

3. The method of claim 1, wherein the wide area network is the Internet.

4. The method of claim 1, wherein one of the user agent server and the user agent client is associated with a call center.

5. The method of claim 1, wherein the headers comprise user-to-user information.

6. The method of claim 1, wherein communications between the user agent server and the user agent client do not rely on a public switched telephone network.

7. The method of claim 1, wherein the headers comprise one of a call ID, an IP address, and a via header.

8. The method of claim 1, wherein the SIP communication occurs via real-time transport protocol.

9. The method of claim 1, wherein the SIP communication follows a separate network path from the HTTP request.

10. A system comprising:
a processor; and
a computer-readable storage medium storing instructions which, when executed by the processor, cause the processor to perform operations comprising:
receiving, at a user agent client via a wide area network from a user agent server associated with a caller device, a Hypertext Transfer Protocol (HTTP) request containing Session Initiation Protocol (SIP) headers, wherein the user agent client is separate from the user agent server, and wherein the user agent client operates on a first application server and the user agent server operates on a second application server separate from the first application server;
constructing a SIP request from the SIP headers;
transmitting the SIP request to a callee device identified in the SIP headers;
receiving from the callee device an acceptance of the SIP request;
converting the acceptance to an HTTP response; and
transmitting, via the wide area network, the HTTP response to the user agent server.

11. The system of claim 10, wherein the HTTP response contains information which the user agent server can convert to a SIP response for establishing a SIP communication between the caller device and the callee device.

12. The system of claim 10, wherein the SIP request comprises SIP invite.

13. The system of claim 10, wherein the wide area network is the Internet.

14. A computer-readable storage device storing instructions which, when executed by a computing device, cause the computing device to perform operations comprising:
converting, at a user agent server, a Session Initiation Protocol (SIP) invite from a caller device to a Hypertext Transfer Protocol (HTTP) request, wherein the HTTP request contains headers from the SIP invite;
transmitting, via a wide area network connection, the HTTP request to a user agent client associated with a callee device to which the SIP invite is addressed, wherein the user agent server is separate from the user agent client;
receiving, from the user agent client and via the wide area network, an HTTP response to the HTTP request, wherein the HTTP response is based on a response from the callee device;
converting the HTTP response to a SIP response; and
transmitting the SIP response to the caller device, wherein the SIP response contains an instruction for establishing a SIP communication between the caller device and the callee device, and wherein the user agent client can convert the HTTP request to a reconstructed SIP invite and send the reconstructed SIP invite to the callee device.

15. The computer-readable storage device of claim 14, wherein the headers comprise user-to-user information.

16. The computer-readable storage device of claim 14, wherein communications between the user agent server and the user agent client do not rely on a public switched telephone network.

17. The computer-readable storage device of claim 14, wherein the headers comprise one of a call ID, an IP address, and a via header.

* * * * *